United States Patent [19]

Ogura

[11] 4,264,130
[45] Apr. 28, 1981

[54] SELF-FOCUSING FIBER ARRAY

[75] Inventor: Yukio Ogura, Yokohama, Japan

[73] Assignee: Ricoh Co., Ltd., Tokyo, Japan

[21] Appl. No.: 49,436

[22] Filed: Jun. 18, 1979

[30] Foreign Application Priority Data

Jun. 20, 1978 [JP] Japan ................................. 53-74722

[51] Int. Cl.³ ............................ G02B 5/17; G02B 5/14
[52] U.S. Cl. ................................. 350/96.25; 350/96.31
[58] Field of Search ............... 350/96.24, 96.25, 96.30, 350/96.31

[56] References Cited

U.S. PATENT DOCUMENTS

| 2,825,260 | 3/1958 | O'Brien | 350/96.25 |
| 3,016,758 | 1/1962 | Kapany | 350/96.25 |
| 3,658,407 | 4/1972 | Kitano et al. | 350/96.31 X |

*Primary Examiner*—John K. Corbin
*Assistant Examiner*—Rodney B. Bovernick
*Attorney, Agent, or Firm*—Wyatt, Gerber, Shoup, Scobey & Badie

[57] ABSTRACT

A self-focusing fiber array comprises three rows of self-focusing fibers, which are most closely packed and each of the self-focusing fibers substantially satisfies an equation of $$n(r) = n_o(1 - \tfrac{1}{2} ar^2),$$

where $n_o$ is the refractive index at the center of the cross section of each of the self-focusing fibers and $n(r)$ is the refractive index at a distance r from the center of the cross section and a is a positive constant, and each of the self-focusing fibers is equal in the length under a condition of $$\frac{\pi}{\sqrt{a}} < Z \leq \frac{2}{\sqrt{a}} (\pi - \tan^{-1}\sqrt{6})$$

and each end surface of the self-focusing fibers is in the same plane.

8 Claims, 6 Drawing Figures

SELF-FOCUSING FIBER ARRAY

BACKGROUND OF THE INVENTION

The present invention relates to a self-focusing fiber array in which a number of self-focusing fibers are arrayed in a plurality of rows.

Generally, the self-focusing fiber is a transparent thin fiber whose cross section is round in shape and its refractive index n(r) at a distance r from the center of the cross section is represented by the following equation:

$$n(r) = n_o(1 - \tfrac{1}{2} ar^2)$$

where $n_o$ represents the refractive index at the center of the cross section of the self-focusing fiber and a is a positive constant.

The self-focusing fiber has a function of image formation. When the self-focusing fiber is employed in the image formation apparatus of an electrophotographic copying apparatus or of a cathode ray tube apparatus, the self-focusing fiber is used in the form of a self-focusing fiber array in which a number of the self-focusing fibers having an equal length are arrayed in a row, with each end surface of the self-focusing fibers lined up.

The types of images formed by the self-focusing fiber vary, depending upon its length. Namely, by changing the length of the self-focusing fiber, images, which are equal, magnified, and reduced in size, can be selectively obtained and furthermore, erecting image, inverted image, real image and virtual image can also be obtained selectively. Therefore, the length of the self-focusing fiber determines the type of the formed image.

Japanese patent publications Nos. 37550/75 and 28058/72 disclose that length Z of the self-focusing fiber for forming equally magnified erecting images is described to be in the following range:

$$\frac{(2m-1)\pi}{\sqrt{a}} < Z \le \frac{2m\pi}{\sqrt{a}}$$

where m is a positive integer. However, when m is 2 or more under this condition, the self-focusing fiber cannot be used practically in view of its brightness, unevenness of the quantity of light, resolution, etc. Furthermore, in Japanese patent publication No. 10455/72, it is described that the length Z of the self-focusing fiber at the time an equally magnified erecting image is formed at the end surface of the self-focusing fiber is $$Z = \frac{2n\pi}{\sqrt{a}}$$

where n is a positive integer. However, this condition is not practical since unevenness of the quantity of light is too great. In this image formation method in which images are formed at the end surface of the self-focusing fiber, the image formation end surface of the self-focusing fiber has to be brought into close contact with the surface of a photoconductor. In order to prevent the image formation end surface of the self-focusing fiber from being smeared, a design is made so as to retract the self-focusing fiber from the surface of photoconductor except during the exposure process.

SUMMARY OF THE INVENTION

It is therefore a principal object of the present invention to provide a self-focusing fiber array which does not form images at the end surface thereof and which is capable of obtaining equally magnified erecting images having a sufficient brightness with less unevenness of the quantity of light and a good resolution.

In the present invention, a number of self-focusing fibers, each of which substantially satisfies the following equation, are most closely packed in at least three rows, $$n(r) = n_o(1 - \tfrac{1}{2}ar^2)$$

where $n_o$ is the refractive index at the center of the cross section of the self-focusing fiber, and n(r) is the refractive index at a distance r from the center of the cross section, and a is a positive constant, and each of the self-focusing fibers is equal in the length under a condition of $$\frac{\pi}{\sqrt{a}} < Z \le \frac{2}{\sqrt{a}}(\pi - \tan^{-1}\sqrt{6})$$

and each end surface of the self-focusing fiber is in the same plane.

According to the present invention, a self-focusing array, capable of forming equally magnified images having sufficient brightness with less unevenness of the quantity of light and a good resolution can be obtained. Furthermore, since the self-focusing fiber array of the present invention is not of a type for forming images at the end surface thereof, a sufficient depth of focus can be obtained and transportation of a photoconductor is simple, and the end surface of the fiber array is not smeared, and retraction of the fiber array from the surface of the photoconductor is unnecessary.

DETAILED DESCRIPTION OF THE PREFERRED EMBODIMENTS

Figure 1:
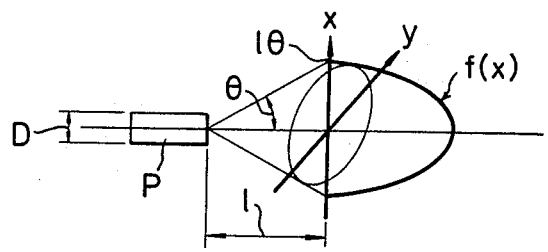
FIG. 1 shows the distribution of the quantity of light of a single self-focusing fiber.

First of all, a theoretical basis of the setting the length of a self-focusing fiber of the present invention will now be explained. Referring to FIG. 1, when the refractive index distribution of the self-focusing fiber P can be approximated to be $n(r) = n_o(1-\tfrac{1}{2}ar^2)$, its brightness distribution $f_o(x)$ can be given by $$f(x) = k \frac{\pi}{4} \left(\frac{D}{l}\right)^2 \left(1 - \frac{x^2}{(l\theta)^2}\right) \quad (1)$$

where k is the product of the luminance of an object and the transmittance of the self-focusing fiber P and $\theta$ is the maximum semi-field angle and D is the diameter of the self-focusing fiber and l is the image surface distance and x is in the range of $f(x) \geq 0$.

The quantity of light, $f_1(x)$, which is obtained by scanning the self-focusing fiber in the direction y can be determined as follows:

In an ellipsoid of rotation $$\frac{x^2}{x_0^2} + \frac{y^2}{y_0^2} + \frac{z^2}{z_0^2} = 1$$

its cross line with a plane x=r becomes the following ellipse:

$$\frac{y^2}{y_0^2(1 - \frac{r^2}{x_0^2})} + \frac{z^2}{z_0^2(1 - \frac{r^2}{x_0^2})} = 1$$

The area of this ellipse S is $$S = \pi y_0 z_0 (1 - \frac{r^2}{x_0})$$

Hence $f_1(x)$ $$f_1(x) = \frac{S}{2} = \frac{\pi}{2} y_0 z_0 (1 - \frac{x^2}{x_0})$$

where $$y_0 = l\theta, \quad z_0 = f(0) = k \cdot \frac{\pi}{4} \left(\frac{D}{l}\right)^2$$

Therefore, $$f_1(x) = \frac{\pi}{2} \cdot l\theta \cdot k \frac{\pi}{4} \left(\frac{D}{l}\right)^2 \left(1 - \frac{x^2}{(l\theta)^2}\right) \quad (2)$$

$$= k \frac{\pi^2}{8} \frac{\theta D^2}{l} \left(1 - \frac{x^2}{(l\theta)^2}\right)$$

Figure 2:
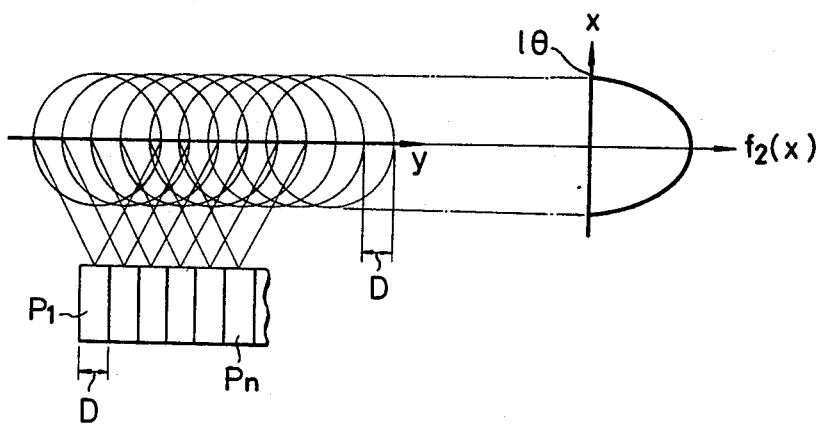
FIG. 2 shows the distribution of the quantity of light of a one-row self-focusing fiber array.

As illustrated in FIG. 2, when a self-focusing fiber array is formed by arranging self-focusing fibers $P_1 \ldots P_n$ in a row, the distribution of average quantity of light, $f_2(x)$, of the self-focusing fiber array is determined as follows: Assuming that the scanning slit extends in the direction y, the overlapping density of the quantity of light of the scanning slit is proportional to $1/D$. Thus, $f_2(x)$ is $$f_2(x) = \frac{1}{D} \times f_1(x) \quad (3)$$

$$= k \frac{\pi^2}{8} \frac{\theta D}{l} \left(1 - \frac{x^2}{(l\theta)^2}\right)$$

Figure 3:
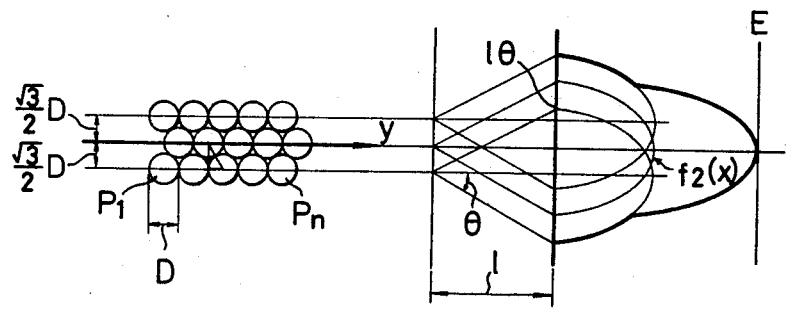
FIG. 3 shows the distribution of the quantity of light of a three-row self-focusing fiber array.

Furthermore, as illustrated in FIG. 3, when a second row of the self-focusing fibers $P_1 \ldots P_n$ is placed a first row of the self-focusing fibers $P_1 \ldots P_n$, with a shift of D/2 with respect to the first row, and a third row of the self-focusing fibers $P_1 \ldots P_n$ is placed on the second row in a mostly packed manner so as to form a three-row self-focusing fiber array, the average brightness at the center of the three-row self-focusing fiber array can be obtained as follows:

Assuming that the center line of the second row is a standard line, the distance between the center line of the first row and that of the third row is $$\frac{\sqrt{3}}{2} D.$$

The brightness E at the center of the three-row array is $$E = f_2(0) + 2f_2\left(\frac{\sqrt{3}}{2} D\right) \quad (4)$$

$$= k \cdot \frac{\pi^2}{8} \left(\frac{\theta D}{l}\right) + k \cdot \frac{\pi^2}{8} \left(\frac{\theta D}{l}\right) \left\{1 - \frac{(\frac{\sqrt{3}}{2} D)^2}{(l\theta)^2}\right\}$$

$$= k \cdot \frac{3}{8}\pi\left(\frac{\theta D}{l}\right) - k \cdot \frac{3}{16} \pi^2 \left(\frac{D^3}{l^3\theta}\right)$$

The maximum value of E can be obtained by calculating dE/dl=0 as follows:

$$\frac{dE}{dl} = -\frac{3}{8}\pi^2 \theta D \left(\frac{1}{l}\right) + \frac{9}{16} \pi^2 \frac{D^3}{\theta} \left(\frac{1}{l}\right)^4$$

where the maximum semi-field angle $\theta$ is $D/2\, n_0\sqrt{a}$ and the image surface distance l is $$l = -\frac{1}{n_0\sqrt{a}} \tan\left(\frac{\sqrt{a}}{2} Z\right) \quad (5\text{-a})$$

(where Z is the length of the self-focusing fiber P.) Therefore, when $\theta$ and l are respectively substituted by the above-mentioned values in Equation (5-a), the following equation is obtained.

$$\tan^2\left(\frac{\sqrt{a}}{2} Z\right) = 6 \quad (5\text{-b})$$

From Equation (5-b), the length Z of the brightest self-focusing fiber array is obtained as follows:

$$\left. \begin{array}{l} Z = \frac{2}{\sqrt{a}} \tan^{-1}\sqrt{6} \\ Z = \frac{2}{\sqrt{a}} (n\pi \pm \tan^{-1}\sqrt{6}) \end{array} \right\} \quad (6)$$

(where n=1, 2, 3, ...) Since the condition that the self-focusing fiber P forms erecting images is $$\frac{(2m - 1)}{\sqrt{a}} \pi < Z \leq \frac{2m\pi}{\sqrt{a}}$$

where m is a positive integer, the shortest length Z of the three-row array is obtained from Equation (6) by substituting n for 1 as follows:

$$Z = \frac{2}{\sqrt{a}} (\pi - \tan^{-1} \sqrt{6}) \quad (7)$$

The brightness E(y) in each position, in the direction y, at the center of the three-row array can be obtained by overlapping Equation (1) as follows:

$$E(y) = z_0 (1 - \frac{y^2}{x_0})^{\frac{1}{2}} + z_0 \left( 1 - \frac{(y-D)^2}{x_0^2} \right)^{\frac{1}{2}} \quad (8)$$

$$+ \ldots + z_0 \left( 1 - \frac{(y-nD)^2}{x_0^2} \right)^{\frac{1}{2}}$$

$$+ z_0 \left( 1 - \frac{(y+D)^2}{x_0^2} \right)^{\frac{1}{2}} + \ldots$$

$$+ z_0 \left( 1 - \frac{(y+nD)^2}{x_0^2} \right)^{\frac{1}{2}}$$

$$+ 2z_0 \left\{ 1 - \frac{(\frac{\sqrt{3}}{2} D)^2 + (y - \frac{D}{2})^2}{x_0^2} \right\}^{\frac{1}{2}} + \ldots$$

$$+ 2z_0 \left\{ 1 - \frac{(\frac{\sqrt{3}}{2} D)^2 + (y - \frac{D}{2} - nD)^2}{x_0^2} \right\}^{\frac{1}{2}}$$

$$+ 2z_0 \left\{ 1 - \frac{(\frac{\sqrt{3}}{2})^2 + (y + \frac{D}{2})^2}{x_0^2} \right\}^{\frac{1}{2}}$$

$$+ \ldots + 2z_0 \left\{ 1 - \frac{(\frac{\sqrt{3}}{2} D)^2 + (y + \frac{D}{2} + nD)^2}{x_0^2} \right\}^{\frac{1}{2}}$$

where n is a positive integer and each term in the above equation is defined in the range of real number and $z_0$ is $$k \frac{\pi}{4} (\frac{D}{l})^2$$

and $x_0$ is $l\theta$.

Assuming that the maximum value of E(y) is Emax and the minimum value thereof is Emin, the unevenness of brightness I is defined by the following equation:

$$I = \frac{Emax - Emin}{Emax} + 100 \, (\%) \quad (9)$$

When the refractive index $n_o$ at the center of each self-focusing fiber P of a self-focusing fiber array that can be used practically is 1.61554 and a constant a is 0.18209 and its diameter D is 1 mm and the product k of the luminance of an object and the transmittance of the self-focusing fiber P is 1, the length P of the self-focus-ing fiber P under the brightest condition can be obtained as 9.19 mm from Equation (7). Furthermore, the condition for the unevenness of brightness, I, to become small is obtained from Equations (8) and (9) and, at the same time, the relationships among the length Z of the self-focusing fiber P obtained from Equation (7) and the brightness E obtained from Equation (4) and the image distance l obtained from Equation (5-a) are also obtained as follows.

| | Length Z | Brightness E | Unevenness of Brightness I | Image Distance l |
|---|---|---|---|---|
| 1 | 8.91mm | 0.23 | 6.34% | 4.23mm |
| 2 | 8.56 | 0.20 | 4.03 | 5.55 |
| 3 | 8.33 | 0.17 | 2.79 | 6.92 |
| 4 | 8.17 | 0.14 | 2.19 | 8.33 |
| . | . | . | . | . |
| . | . | . | . | . |
| . | . | . | . | . |

Figure 4:
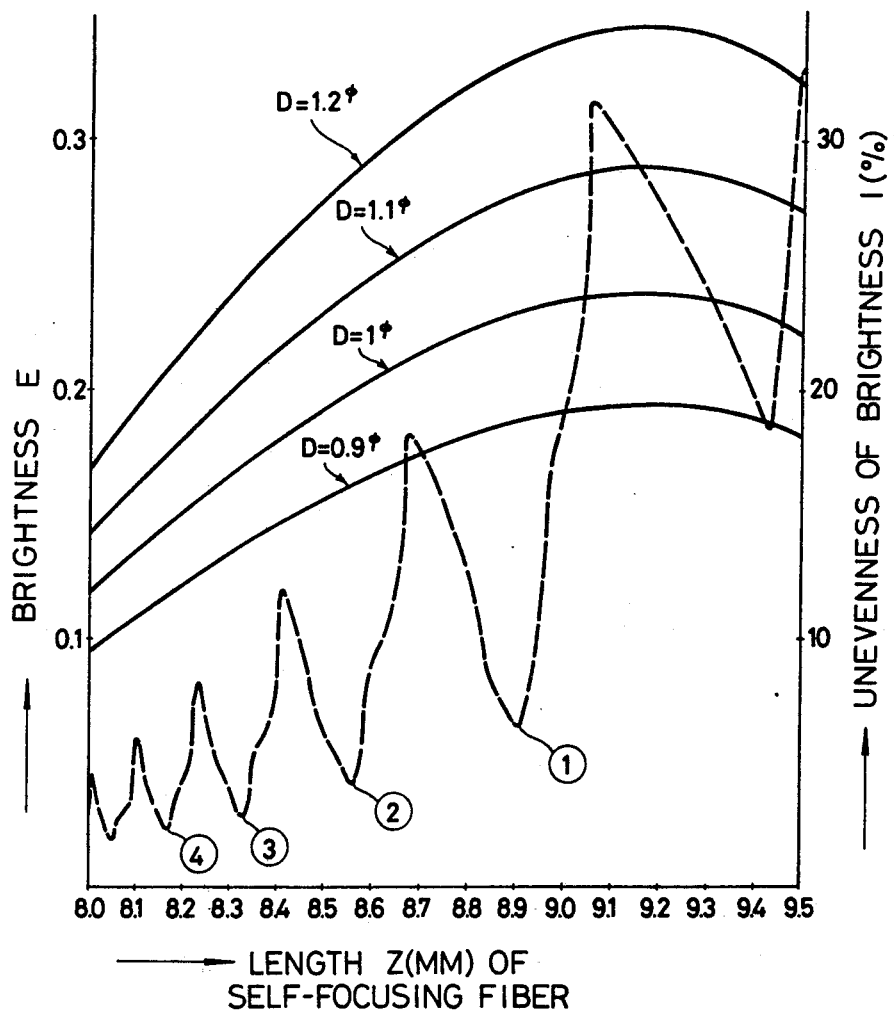
FIG. 4 shows the relationships between the length Z of each self-focusing fiber of the three-row self-focusing fiber array, the brightness E and the unevenness of brightness I of the three-row self-focusing fiber array, with a parameter of the diameter D of the self-focusing fiber.

FIG. 4 shows the above-mentioned relationships with a parameter of the diameter D of the self-focusing fiber P. In FIG. 4, the solid lines indicate the brightness E and the dash lines indicate the unevenness of brightness I. As can be seen from FIG. 4, when $$Z \geq \frac{2}{a} (\pi - \tan^{-1} \sqrt{6}),$$

namely when $Z \geq 9.19$ in this case, the brightness becomes extremely great so that the self-focusing fiber P cannot be used practically.

When $n_o = 1.61554$ and $a = 0.18209$ and $D = 1$ mm and $Z = 8.91$ mm, the radius of light spreading is determined by $l\theta$, and $l\theta$ is obtained from Equation (5-a) as follows:

$$l\theta = -\frac{D}{2} n_o \sqrt{a} \times \frac{1}{n_o \sqrt{a}} \tan (\frac{\sqrt{a}}{2} Z) \quad (10)$$

$$= -\frac{D}{2} \tan (\frac{\sqrt{a}}{2} Z)$$

Calculation of $l\theta$ under the above-mentioned condition gives $l\theta = 1.45$ mm and since $$\frac{\sqrt{3}}{2} D \text{ is } 0.8667\text{mm},$$

it can be seen that the brightness cannot be increased by increasing the number of the rows to 4 or more. Therefore, the array should comprise at least three rows of the self-focusing fibers and in particular, the three-way array is the most efficient. So far, the theoretical basis of the present invention concerning the length of the self-focusing fiber and the number of the rows of the self-focusing fibers have been explained.

Figure 5:
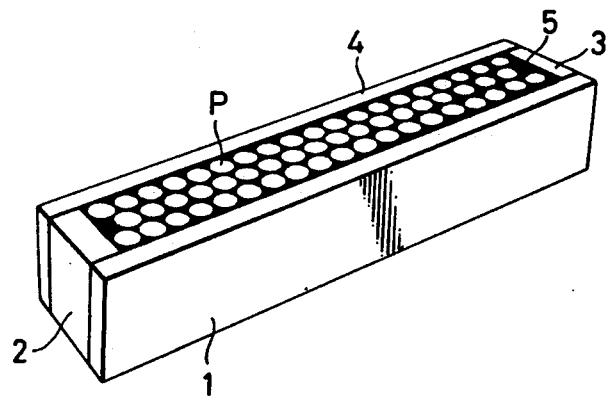
FIG. 5 is a perspective view of a three-row self-focusing fiber array according to the present invention.

The self-focusing fibers P, whose length has been determined in the above-mentioned manner, are arranged in the most packing manner, for instance, in three rows, with the respective opposite ends situated in the same plane, to form a self-focusing fiber array as illustrated in FIG. 5.

The array is formed by the following procedure: First, the self-focusing fibers P are arranged in three rows on a support plate 1 which is supported by a jig. The opposite side portions of the self-focusing fibers P are held firmly between the spacers 2 and 3. Another support member 4 is attached to cover and hold the self-focusing fibers P. An adhesive 5 is poured into the spaces between the self-focusing fibers P and between the self-focusing fibers P and the support plates 1 and 4 and the spacers 2 and 3, and is then hardened. The support plates 1 and 4 and the spacers 2 and 3 are made of Fiber Reinforced Plastics or Bakelite. The adhesive 5 comprises an epoxy adhesive or silicone adhesive whose refractive index is higher than that of the peripheral portion of the self-focusing fiber P and a light absorbing material, such as carbon black. In order to finish the end surfaces of the fiber array, the self-focusing fibers, which are slightly longer than a predetermined length, are assembled in the array and thereafter, the opposite end surfaces of the self-focusing fibers are ground to the predetermined length.

Figure 6:
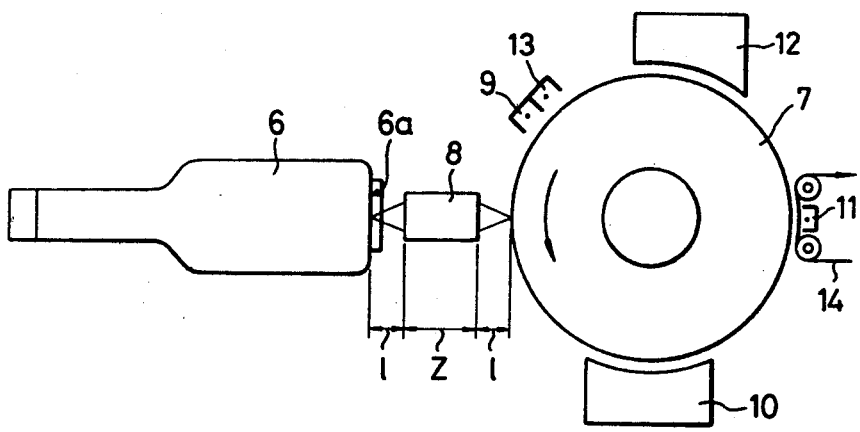
FIG. 6 is a diagrammatic figure of a cathode ray tube apparatus in which a self-focusing fiber array according to the invention is employed.

FIG. 6 schematically illustrates an example of the fiber array which is employed in a cathode ray tube apparatus. Between a fluorescent surface 6a of a cathode ray tube 6 and a photoconductor drum 7, there is disposed a self-focusing array 8 whose length is Z, with a space l between one end surface of the self-focusing fiber array 8 and the fluorescent surface 6a and the same space l between the other end surface of the self-focusing fiber array 8 and the surface of the photoconductor drum 7, and with the center of the fiber array 8 coinciding with a light emitting portion of the fluorescent surface 6a. Around the photoconductor drum 7, there are arranged a charging corona charger 9, a development apparatus 10, an image transfer corona charger 11, a cleaning apparatus 12 and a quenching corona charger 13. After the surface of the photoconductor drum 7 is charged by the charging corona charger 9, latent electrostatic images are formed on the surface of the photoconductor drum 7 by the cathode ray tube 6. Image signals obtained by scanning an original document are applied to the cathode ray tube 6 and the fluorescent surface 6a emits light in lines in accordance with the image signals and the thus-emitted light forms an equally magnified erecting image on the surface of the photoconductor drum 7 through the self-focusing fiber array 8. The thus formed latent electrostatic image on the surface of the photoconductor drum 7 is developed with toner supplied from the development apparatus 10 and a transfer sheet 14 is transported to come above the developed image and the developed image is transferred to the transfer sheet 14 by the image transfer charger 11. After image transfer, the surface of the drum 7 is cleaned by the cleaning apparatus 12 and charges on the surface of the drum 7 are then quenched by the quenching corona charger 13, whereby one copying cycle is completed.

As mentioned above, when the self-focusing fiber array 8 is employed in the cathode ray tube apparatus, since there is the space l between the end surface of the fiber array 8 and the surface of the drum 7, the end surface of the fiber array 8 is not smeared by the toner on the surface of the drum 7 and accordingly the image formation performance of the fiber array 8 is not lowered by the toner. Furthermore, when the self-focusing fiber array 8 is employed, in the cathode ray tube apparatus, the number of the expensive self-focusing fibers is less than that in a conventional cathode ray tube apparatus in which the self-focusing fibers, which do not have a function of forming images but which only transmit light, are employed as a face plate. Therefore, the cathode ray tube apparatus employing the fiber array 8 is lower in the cost and simpler in assembling than the conventional cathode ray tube apparatus. Furthermore, in comparison with a conventional apparatus employing self-focusing fibers having an image formation function, the cathode ray tube apparatus employing the self-focusing fiber array 8 can form better images since the array 8 is brighter, with less unevenness of brightness, and has a better resolution.

The self-focusing fiber array according to the present invention can be employed as an image formation lens for exposure in electrophotographic copying apparatus and in other image formation optical systems, in addition to the light transmitting element in the above-mentioned cathode ray tube apparatus. All the known techniques concerning the conventional self-focusing fiber array are also utilized in the self-focusing fiber array of the present invention.

What is claimed is:

1. A self-focusing fiber array comprising a number of self-focusing fibers having a refractive index which substantially satisfies a relationship of $$n(r) = n_o (1 - \tfrac{1}{2} ar^2)$$

where $n_o$ is the refractive index at the center of the cross section of each of said self-focusing fibers and n(r) is the refractive index at a distance r from said center and a is a positive integer, said self-focusing fibers arranged in at least three rows under the closest packing conditions and the length of each of said self-focusing fibers being equally Z which satisfies a relationship of $$\tfrac{\pi}{\sqrt{a}} < Z \leq \tfrac{2}{\sqrt{a}} (\pi - \tan^{-1} \sqrt{6})$$

and each end surface of said self-focusing fibers being in the same plane.

2. A self-focusing fiber array as in claim 1 wherein said fibers are arranged in three rows.

3. A self-focusing fiber array as in claim 2 wherein the first and second rows are offset with respect to each other and the first and third rows are aligned with respect to each other.

4. A self-focusing fiber array as in claim 1 wherein the fibers are held in a hardened adhesive.

5. A self-focusing fiber array as in claim 1 wherein the fibers are held in a hardened adhesive having a refractive index higher than the peripheral portions of the fibers.

6. A self-focusing fiber array as in claim 1 in a cathode ray tube apparatus, comprising a cathode ray tube having a fluorescent surface, a photoconductor drum, a charging corona charger, a development apparatus, and an image transfer corona charger; the said fiber array being positioned between said fluorescent surface and said drum photoconductor surface.

7. A self-focusing fiber array as in claim 6 wherein said fibers are arranged in three rows.

8. A self-focusing fiber array as in claim 6 wherein the end of said array is spaced from the surface of the drum by a sufficient space so that the end of the array is not smeared by toner on the drum surface.

* * * * *